United States Patent
Carrasco

(10) Patent No.: US 9,770,734 B2
(45) Date of Patent: Sep. 26, 2017

(54) DEVICE FOR PRODUCING HOT COATED PRODUCTS HAVING A BRANCHED OUTLET AND EXTERNAL MIXER AND METHOD FOR PRODUCING CORRESPONDING HOT COATED PRODUCTS

(71) Applicant: Antoine Carrasco, Marennes (FR)

(72) Inventor: Antoine Carrasco, Marennes (FR)

(73) Assignee: ARGUMAT, Zac du Chapotin, Chaponnay (FR)

( * ) Notice: Subject to any disclaimer, the term of this patent is extended or adjusted under 35 U.S.C. 154(b) by 0 days.

(21) Appl. No.: 14/394,221

(22) PCT Filed: Apr. 12, 2013

(86) PCT No.: PCT/FR2013/050799
§ 371 (c)(1),
(2) Date: Oct. 13, 2014

(87) PCT Pub. No.: WO2013/153341
PCT Pub. Date: Oct. 17, 2013

(65) Prior Publication Data
US 2015/0064350 A1 Mar. 5, 2015

(30) Foreign Application Priority Data
Apr. 13, 2012 (FR) ...................... 12 53449

(51) Int. Cl.
*B28C 5/46* (2006.01)
*B05C 3/08* (2006.01)
(Continued)

(52) U.S. Cl.
CPC ............ *B05C 3/08* (2013.01); *B01F 13/1027* (2013.01); *B05C 11/00* (2013.01); *B05D 1/18* (2013.01);
(Continued)

(58) Field of Classification Search
CPC ... B28C 5/466; B28C 5/2036; B28C 13/1025; B28C 13/1036; B01F 9/001;
(Continued)

(56) References Cited

U.S. PATENT DOCUMENTS

| 4,103,350 A | * | 7/1978 | Brock | ................. E01C 19/1031 |
| | | | | 106/281.1 |
| 4,427,376 A | * | 1/1984 | Etnyre | .................... E01C 7/267 |
| | | | | 366/25 |

(Continued)

FOREIGN PATENT DOCUMENTS

| DE | 1961456 A1 * | 6/1971 | ......... E01C 19/1013 |
| EP | 0 352 648 A1 | 1/1990 | |
| EP | 0 442 790 A1 | 8/1991 | |

OTHER PUBLICATIONS

International Search Report, mailed Aug. 27, 2013 in connection with PCT International Application No. PCT/FR2013/050799, filed Apr. 12, 2013

*Primary Examiner* — Charles Cooley
(74) *Attorney, Agent, or Firm* — John P. White; Cooper & Dunham LLP

(57) ABSTRACT

A device for manufacturing hot-mix coated materials includes an oven (1) having an enclosure (2) provided towards its two opposite ends with a main inlet (3) designed to receive granular materials and with a main outlet; and a heater (10) defining a combustion section (5) inside the enclosure (2). The enclosure (2) starting with the combustion section (5) and continuing with a drying section (6), and then with a mixing section (7). The device is further provided with a bypass outlet (11) and with an external mixer (12) that is connected to the bypass outlet (11), which outlet is fitted with a blocking system (15) allowing granular materials to pass towards the inlet (13) of the external mixer (Continued)

(12) and a closed position allowing granular materials to pass towards the mixing section (7).

17 Claims, 2 Drawing Sheets

(51) Int. Cl.
B01F 13/10 (2006.01)
E01C 19/10 (2006.01)
B05C 11/00 (2006.01)
B05D 1/18 (2006.01)
C09D 195/00 (2006.01)

(52) U.S. Cl.
CPC ............ *B28C 5/466* (2013.01); *C09D 195/00* (2013.01); *E01C 19/1027* (2013.01); *E01C 19/1036* (2013.01)

(58) Field of Classification Search
CPC ......................... B01F 9/0012; B01F 13/1025; B01F 13/1036; B01F 13/1027; E01C 19/1036; E01C 19/1027; E01C 19/1031; B05C 3/08
USPC .................................................. 366/24, 25
See application file for complete search history.

(56) References Cited

U.S. PATENT DOCUMENTS

| | | | | |
|---|---|---|---|---|
| 4,600,379 A * | 7/1986 | Elliott | ................. | E01C 19/1022 126/343.5 A |
| 4,616,934 A * | 10/1986 | Brock | ................. | E01C 19/1004 366/22 |
| 4,715,720 A * | 12/1987 | Brock | ................. | E01C 19/1004 366/22 |
| 4,946,283 A * | 8/1990 | Musil | ................. | E01C 19/1004 366/147 |
| 4,954,995 A * | 9/1990 | Marconnet | .......... | E01C 19/1036 166/66.6 |
| 4,955,722 A * | 9/1990 | Marconnet | .......... | E01C 19/1004 366/25 |
| 5,002,398 A * | 3/1991 | Musil | ................. | E01C 19/1004 366/147 |
| 5,052,810 A * | 10/1991 | Brock | ................. | E01C 19/1036 366/25 |
| 5,174,650 A * | 12/1992 | McFarland | ......... | E01C 19/1036 366/23 |
| 5,178,456 A * | 1/1993 | Marconnet | .......... | E01C 19/1036 34/136 |
| 5,201,472 A * | 4/1993 | Brock | .................... | B03B 9/065 241/101.8 |
| 5,261,738 A * | 11/1993 | Brock | ................. | E01C 19/1036 34/136 |
| 5,273,355 A * | 12/1993 | May | ..................... | B09B 3/0033 110/226 |
| 5,320,426 A * | 6/1994 | Keylon | ............... | E01C 19/1036 34/550 |
| 5,378,059 A * | 1/1995 | Brock | ....................... | B09C 1/06 366/25 |
| 5,380,082 A * | 1/1995 | Milstead | ............ | B01F 7/00158 34/183 |
| 5,380,084 A * | 1/1995 | Milstead | ............... | B01F 7/0025 34/183 |
| 5,480,226 A * | 1/1996 | Milstead | ............. | E01C 19/1036 34/137 |
| 5,522,158 A * | 6/1996 | Swanson | ............. | E01C 19/1036 34/131 |
| 5,551,166 A * | 9/1996 | Milstead | ............. | E01C 19/1036 34/131 |
| 6,196,710 B1 * | 3/2001 | Swanson | ............. | E01C 19/1031 34/131 |
| 7,566,162 B1 * | 7/2009 | Swanson | ................. | C08L 95/00 366/15 |
| 7,927,413 B2 * | 4/2011 | Brock | ................. | E01C 19/1004 106/122 |
| 9,566,557 B2 * | 2/2017 | Huh | ........................ | B01F 9/001 |
| 2015/0030767 A1 * | 1/2015 | Carrasco | ............. | E01C 19/1036 427/212 |
| 2015/0064350 A1 * | 3/2015 | Carrasco | ............. | E01C 19/1027 427/212 |

* cited by examiner

DEVICE FOR PRODUCING HOT COATED PRODUCTS HAVING A BRANCHED OUTLET AND EXTERNAL MIXER AND METHOD FOR PRODUCING CORRESPONDING HOT COATED PRODUCTS

CROSS-REFERENCE TO RELATED APPLICATIONS

This application is a §371 national stage of PCT International Application No. PCT/FR2013/050799, filed Apr. 12, 2013, claiming priority of French Patent Application No. 1253449, filed Apr. 13, 2012, the contents of each of which are hereby incorporated by reference in their entirety.

TECHNICAL FIELD

The present invention relates to the general technical field of devices and methods for manufacturing hot-mix coated materials, e.g. materials coated with bitumen, in order to obtain bituminous coated materials from a mass of aggregates or solid granular materials, whether they be granules that are new and cold, and/or used bituminous materials to be recycled, or a mixture of both, in order to create a finished coated material that can be used, for example, in the field of building and public works.

The present invention relates more particularly to a device for manufacturing hot-mix coated materials, e.g. materials coated with bitumen, the device comprising:

an oven comprising an enclosure that is substantially cylindrical and designed to be caused to rotate about its longitudinal axis by drive means, said enclosure being provided in the vicinity of its two opposite ends, firstly with a main inlet designed to receive non-coated virgin granular materials or recycled granular materials, or a mixture of both, of the type comprising chippings or granules, and secondly with a main outlet for the bituminous coated materials that are manufactured inside the enclosure, said granular materials flowing from the main inlet towards the outlet along a direction F in order to be transformed into coated materials on reaching the main outlet, after passing through and being treated inside the enclosure; and heater means defining a combustion section inside the enclosure and generating a drying flow that is suitable for drying the granular materials, said enclosure starting with said combustion section and continuing with a drying section, and then with a mixing section.

The invention also relates to a method of manufacturing hot-mix coated materials using a drum mixer defined by a main inlet and a main outlet, said drum mixer being made up of a series of successive sections comprising a combustion section, a drying section, and a mixing section.

PRIOR ART

The devices for manufacturing hot-mix coated materials, in particular bituminous coated materials, are known and generally consist of revolving ovens generally referred to as drum mixers. The techniques implemented may be so called "continuous" or "batch" techniques, and, depending on the relative movement of the heating flow and of the granules, they operate using the so-called "parallel" flow (or unidirectional flow) or "counter-current" flow techniques.

Known devices and manufacturing methods implement a drying oven that is generally in the form of a cylindrical body of revolution defining an enclosure presenting at least one inlet at one of its ends and at least one outlet at its other end, the drying oven being driven in rotation by any suitable means while the mass of aggregate or chippings to be treated is introduced via one end in such a manner as to progress towards the outlet end in order to be treated.

The rotation of the enclosure thus makes it possible to cause the aggregate, which enters via the inlet when it is cold and wet, to flow towards the other or outlet end, while being stirred and lifted up inside the enclosure by using any appropriate means, and for example by using lifting blades mounted on the internal peripheries of the walls of the enclosure.

Known ovens also implement a heating flow generated by a burner associated with the enclosure, which burner delivers a flame in a combustion zone of the enclosure, the flame emitting a flow of hot air that, depending on the type of oven, flows in the opposite direction, or else in the same direction as the direction in which the cold and wet aggregate flows inside the enclosure.

Generally, known rotating ovens implement a drum mixer defined by a main inlet and a main outlet and that is made up of a series of successive sections comprising, in consideration of the direction in which the granules progress inside the oven, a combustion section, then a drying section, and finally a mixing section.

The normal operation of those conventional rotating ovens implies that the granules, whether new or used, or a mixture of both, must necessarily pass through the final mixing section in which a fraction of liquid bitumen is injected in automated and controlled manner, which liquid bitumen needs specifically to be mixed with the granules in the mixing zone in order to obtain the end product at the outlet of said mixing zone.

That technique generally gives satisfaction, but is not well adapted to all types of coated materials that might need to be manufactured, and in particular coated materials known as "special" materials, for which particular mixing conditions may be sought after or required, and those particular mixing conditions can require not passing through the mixing zone, which would lead to immediate mixing with liquid bitumen, at least at this stage of manufacturing. It may be necessary to have recourse to various treatments prior to coating with bitumen, where it can prove to be necessary to perform particular operations on the hot granules, e.g. coloring the granules after drying.

In practice, and even though this is not an optimal solution, special hot-mix coated materials is manufactured by passing through the mixing zone of a conventional drum mixer, which firstly accelerates wear and secondly leads to manufacturing special hot-mix coated materials under technical and economic conditions that are also not optimal. Manufacturing special hot-mix coated materials in a device that is not specifically adapted for that type of manufacturing requires new settings of the operating parameters of the drum mixer and that involves wasting time and associated materials due to eliminating scrap at the beginning and at the end of manufacture. That generally leads to an overall economic loss.

SUMMARY OF THE INVENTION

The objects assigned to the invention consequently aim to overcome the various above-mentioned disadvantages and to provide a new device and a new method of manufacturing hot-mix coated materials, e.g. materials coated with bitumen, which materials are particularly multi-purpose and suitable for being adapted to various industrial production situations.

Another object of the invention aims to provide a new device and a new method of manufacturing hot-mix coated materials that are particularly simple, economic, and effective to implement.

Another object of the invention aims to provide a new device and a new method of manufacturing hot-mix coated materials that are particularly robust, and that implement tested technical means.

The objects assigned to the invention are met using a device for manufacturing hot-mix coated materials, e.g. materials coated with bitumen, the device comprising:

an oven comprising an enclosure that is substantially cylindrical and designed to be caused to rotate about its longitudinal axis by drive means, said enclosure being provided in the vicinity of its two opposite ends, firstly with a main inlet designed to receive non-coated virgin granular materials or recycled granular materials, or a mixture of both, of the type comprising chippings or granules, and secondly with a main outlet for the bituminous coated materials that are manufactured inside the enclosure, said granular materials flowing from the main inlet towards the outlet along a direction F in order to be transformed into coated materials on reaching the main outlet, after passing through and being treated inside the enclosure; and heater means defining a combustion section inside the enclosure and generating a drying flow that is suitable for drying the granular materials, said enclosure starting with said combustion section and continuing with a drying section, and then with a mixing section, the device being characterized in that it is provided with a bypass outlet incorporated between the drying section and the mixing section, and with an external mixer including an inlet and an outlet, said external mixer being connected to said bypass outlet, which outlet is fitted with a blocking system that is movable between an open position allowing granular materials to pass towards the inlet of the external mixer and a closed position allowing granular materials to pass towards the mixing section.

The aims of the invention are also achieved using a method of manufacturing hot-mix coated materials in a single device comprising firstly, a drum mixer defined by a main inlet and a main outlet, said drum mixer being made up of a series of successive sections comprising a combustion section, a drying section, and a mixing section and secondly an external mixer connected continuously to the drying section by a bypass outlet, said method being such that manufacturing hot-mix coated materials can be performed selectively and continuously by mixing, either in the mixing section of the drum, or in the external mixer in the drying section of the drum and the hot-mix coated materials manufactured may then be directed towards a shared outlet of the single device for recovering them.

BRIEF DESCRIPTION OF THE DRAWINGS

Other characteristics and advantages of the invention appear in greater detail on reading the following description made with reference to the accompanying drawings, given solely by way of illustrative and nonlimiting example, in which.

BEST MODE OF CARRYING OUT THE INVENTION

Figure 1:
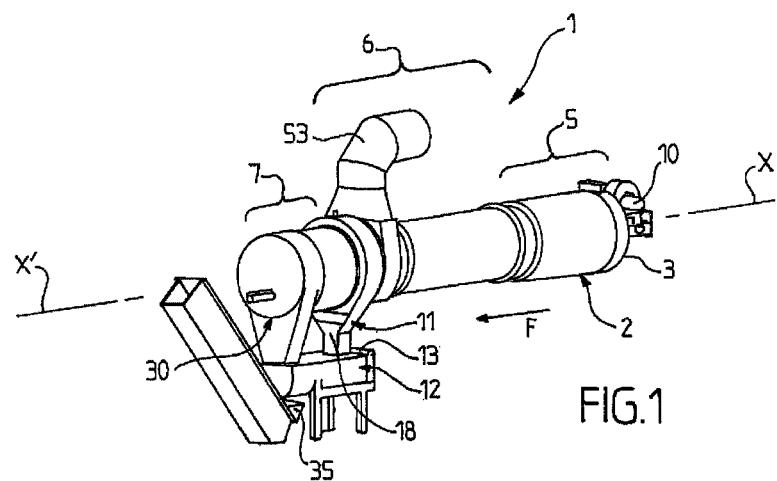
FIG. 1 is a perspective view showing a device for manufacturing hot-mix coated materials of the invention.

FIG. 1 is a perspective view showing a general view of a device for manufacturing hot-mix coated materials of the invention and, for example, intended for manufacturing materials coated with bitumen, in order to manufacture bituminous coated materials.

Purely by way of illustration, the device shown in FIG. 1 is a so-called parallel flow device insofar as the heating flow F flows in the same direction as the direction in which the granular materials are fed and progress inside the device (shown by the arrow F).

Figure 4:
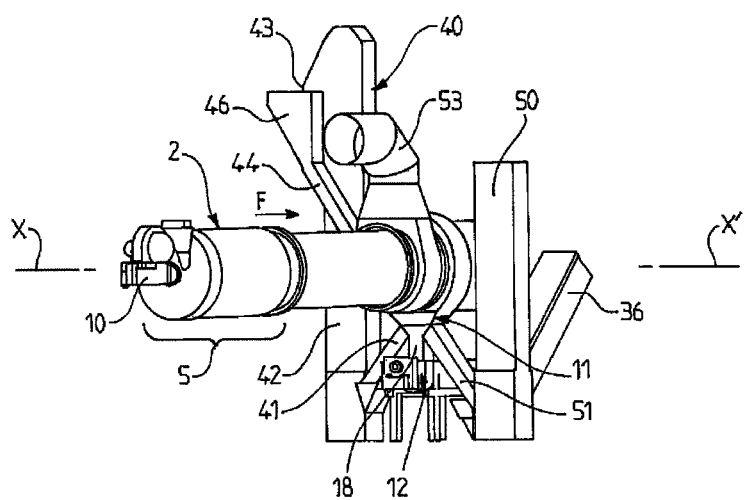
FIG. 4 is a rear perspective view showing another variant embodiment of a device of the invention for manufacturing hot-mix coated materials.

It should however be noted that the invention is also applicable to "counter-current" devices for manufacturing coated materials, in particular bituminous coated materials, in which devices the heating flow flows in the opposite direction to the flow of the granular materials to be dried and to be transformed into bituminous coated materials (FIG. 4).

Likewise, the device of the invention for manufacturing hot-mix coated materials may be either a continuous manufacturing device, or a batch manufacturing device.

The device for manufacturing hot-mix coated materials shown in FIG. 1 comprises an oven 1 or drum mixer comprising an enclosure 2 that is substantially cylindrical and designed to be caused to rotate about its longitudinal axis X-X' by drive means (not shown in the figures), said enclosure 2 being provided in the vicinity of its two opposite ends, firstly with a main inlet 3 designed to receive non-coated virgin granular materials or recycled granular materials, or a mixture of both, of the type comprising chippings or granules, and secondly with a main outlet 30 for the bituminous coated materials that are manufactured inside the enclosure 2, said granular materials flowing from the main inlet 3 towards the outlet 30 along a direction F in order to be transformed into coated materials on reaching the main outlet 30, after passing through and being treated inside the enclosure 2.

In a manner well known to the person skilled in the art, the drive means (not shown in the figures) include, in known manner, an energy source, of the motor type, driving the enclosure 2 itself, via a series of gears or conventional drive system, e.g. constituted of rollers coming to engage on the drive means that are secured to the external wall 2A of the enclosure 2.

Thus, the device for manufacturing hot-mix coated materials of the invention is a drum mixer made up of, starting from the inlet 3, a series of successive sections each having one a specific function, the successive sections comprising a combustion section 5, a drying section 6 and a mixing section 7 opening out towards or in the main outlet 30.

In the meaning of the invention, the expression "non-coated virgin granular materials" means any kind of material of the aggregate, chippings, granules, sand, or other type presenting mechanical strength sufficient for it to be used in manufacturing coated materials of all kinds that are suitable for being used as building materials in the field of public works, such as for building roads or walls, without such applications being limiting in any way.

Likewise, in the meaning of the invention, the expression "recycled granular materials" means any kind of materials of the aggregate, chippings, granules, sand, or other type that has already been used as a building material, e.g. for building roads or other structures, and that has already been provided with bitumen-based coating for that purpose, such materials thus being designed to be recycled in order to recycle their coatings or fractions of their coatings.

Together, such virgin or recycled granular materials are thus of very heterogeneous grain sizes, with physical and chemical compositions that are also very heterogeneous, and that are also of very varied size, shape, moisture content, consistency, etc.

In general, the rotary oven is designed so that the virgin or recycled granular materials, or a mixture of both, flow from the main feed inlet 3 to the outlet 30 during rotation of the enclosure 2, so as to be transformed, after passing in succession: firstly through a combustion zone 5 into which the main inlet 3 opens out, then through a drying zone 6 provided with lifting blades, and finally through a mixing zone 7 into which it is also possible, optionally and, for example, continuously, to inject a liquid coating material, e.g. via a tube in such a manner as to produce a bituminous coated material in the vicinity of the outlet 30.

As shown in FIG. 1, the device for manufacturing hot-mix coated materials of the invention also comprises heater means 10 associated with the combustion section 5, said heater means 10 thus being disposed in the vicinity of the main inlet 3 in the specific embodiment shown. By way of example, the heater means 10 are constituted by a burner generating a flame for drying, which flame extends substantially axially in the central zone of the drying section 6 in order to generate a drying flow flowing inside the enclosure 2 along the direction F and thus drying the granular materials in the drying section 6.

The heater means 10 therefore define the combustion section 5 inside the enclosure 2 and generate a drying flow F that is suitable for drying the granular materials, said enclosure continuing in the direction F contiguously from said combustion section 5 firstly with a drying section 6, and then with a mixing section 7.

Thus, according to important characteristics of the invention, the device for manufacturing hot-mix coated materials is provided with a bypass outlet 11 that is incorporated between the drying section 6 and the mixing section 7 and with an external mixer 12 having an inlet 13 and an outlet 14, said external mixer 12 being connected to the bypass outlet 11, which outlet is fitted with a blocking system 15 that is movable between an open position allowing granular materials to pass, during treatment inside the enclosure 2 at the end of the drying section 6, towards the inlet 13 of the external mixer 12, and a closed position allowing the granular materials to pass towards the mixing section 7 of the enclosure 2.

The bypass outlet 11 thus forms a secondary outlet from the enclosure 2 that is early insofar as it enables the granular materials that are undergoing treatment inside in enclosure 2 and that are about to leave the drying section 6 to leave the enclosure 2 early instead of entering the mixing section 7. In a manner that is well known to the person skilled in the art, the bypass outlet 11 is formed, for example, by an opening made in the wall 2A of the enclosure 2, which bypass outlet is fitted with any blocking system well known to the person skilled in the art, of the movable trap door type or equivalent, that is suitable for being controlled manually and/or electrically or even hydraulically by any suitable control means that may possibly be centralized.

Thus, depending on the position of the blocking system 15, the hot granular materials are discharged from the drying section 6 either towards the mixing section 7 of the enclosure 2 or, on the contrary, they are discharged from the enclosure 2 without passing through the mixing section 7 in order to be treated inside the external mixer 12.

These structural characteristics lead to making a device for manufacturing hot-mix coated materials that combines two mixing units in the same device, namely the mixing section 7 of the enclosure 2 and an external mixer 12 that is incorporated therein and that is connected to the bypass outlet 11 of the enclosure 2, so as to form a single device.

This structural characteristic makes it possible to make a device for manufacturing general-purpose hot-mix coated materials, giving the option of performing two different types of mixing in the same device and in the same production cycle, without having to use and adjust two separate machines.

In an additional and particularly advantageous characteristic of the invention, the outlet 14 of the external mixer 12 and the main outlet 30 of the enclosure 2 are arranged relative to each other so as to open out to a shared outlet 35 of the device for manufacturing hot-mix coated materials, which shared outlet 35 is thus also incorporated in the single device of the invention.

In this way, the device of the invention for manufacturing hot-mix coated materials has only a single shared outlet 35 for the finished hot-mix coated materials, thereby conferring great flexibility and versatility of operation to the device.

In particularly advantageous manner, the external mixer 12 is disposed under the mixing section 7, and preferably substantially in line with the mixing section 7, and is connected firstly to the bypass outlet 11 by an incoming chute 18 opening out above the inlet 13 and secondly to the shared outlet 35 via its outlet 14 above which and in line with which there opens out a down chute 19 that is connected to the main outlet 30 of the enclosure 2.

In this manner, the device of the invention allows the oven to be operated in two possible ways, which oven can thus adapt to several operating conditions and, for example:
either to producing bituminous coated materials by passing through the mixing section 7 with bitumen being injected into the mixing section 7;
or to producing "special" hot granules that are to be mixed with bitumen and/or other ingredients in the external mixer 12.

In particularly advantageous manner, the blocking system 15 may be made in such a manner that the bypass outlet 11 is coupled to an inside ring (not shown) mounted concentrically about the enclosure 2 and at its periphery, said ring being mounted to be movable between a closed position and an open position and being positionable in one or the other of these two positions so that it faces the bypass outlet 11.

The ring is provided with one or more openings that come into alignment with the bypass outlet 11 of the enclosure 2 when the ring is in the open position corresponding to discharging the granules to the external mixer 12.

According to another important characteristic of the invention, the shared outlet 35 is connected to an outlet conveyor 36, e.g. of the drag conveyer or of the belt conveyor type.

A device for manufacturing hot-mix coated materials is thus provided that constitutes a complete and single installation.

According to this characteristic, the shared outlet 35 forms a receiving hopper forming the feed element supplying the outlet conveyor 36, the outlet 14 of the external mixer 12 and the down chute 19 of the enclosure 2 opening out in line with and above said shared outlet 35.

Figure 5:
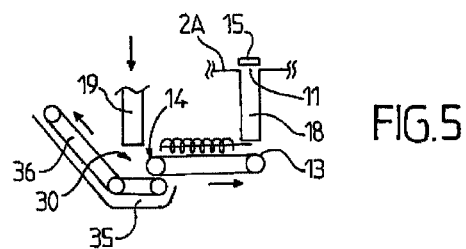
FIG. 5 is a diagrammatic cross-section showing a detail of an embodiment of a device of the invention.
Figure 2:
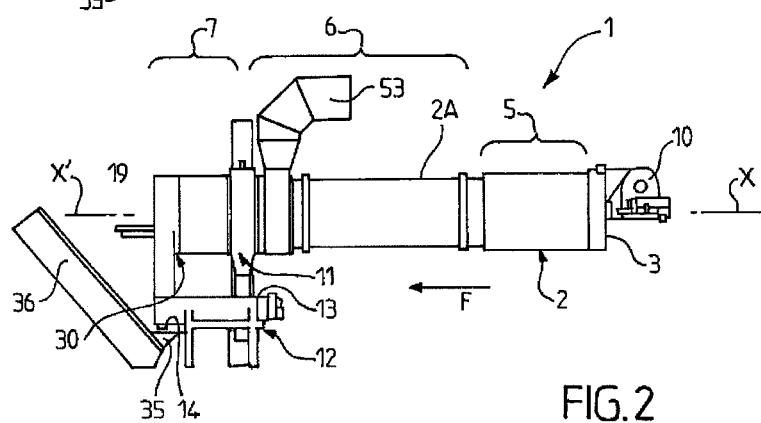
FIG. 2 is a side view showing the device of the invention for manufacturing hot-mix coated materials and as shown in FIG. 1.

In particularly advantageous manner, the external mixer 12 may be a paddle or rotary mixer (FIG. 5), it being understood that other types of mixers may naturally be envisaged.

Figure 3:
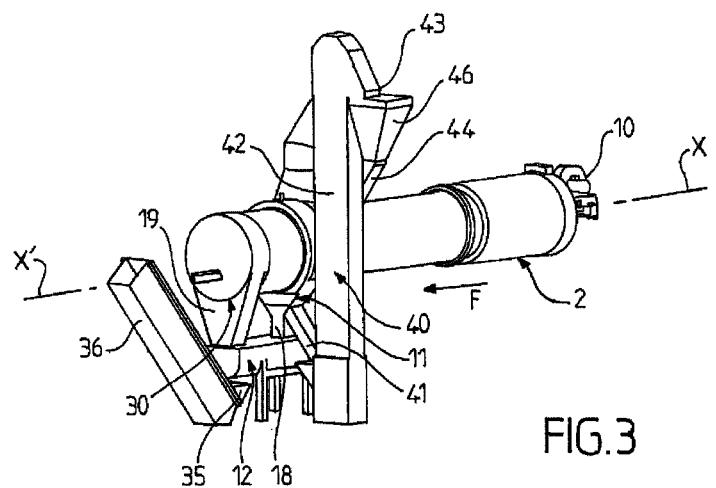
FIG. 3 is a perspective view showing a variant device for manufacturing hot-mix coated materials of the invention.

As shown in FIG. 3, and in a preferred variant of the invention, the device of the invention for manufacturing hot-mix coated materials may also comprise a system for recycling the scrap 40 from the beginning and the end of a production cycle.

The scrap recycling system 40 is connected the inside of the enclosure 2 in the vicinity of the bypass outlet 11, e.g. by a down channel 41, in such a manner as to be capable of directing scrap towards the scrap recycling system 40 before it passes into the mixing section 7.

Preferably, the down channel is connected to the enclosure 2 in the top portion of the incoming chute 18.

In this configuration, the down channel 41 provides a connection between the vicinity of the bypass outlet 11 and the scrap recycling system 40, which system redirects the scrap, either towards the outside of the enclosure 2, or directly into the enclosure 2 itself, e.g. towards the drying section.

In the invention, the scrap recycling system 40 includes a recycling conveyor 42, preferably mounted vertically, having its inlet segment (not shown) situated in the low portion and connected in the vicinity of the bypass outlet 11 via the down channel 41, and its outlet segment 43, situated in the top portion, opens out into the enclosure 2 via a storage hopper 46, preferably in the drying zone 6.

By means of this arrangement, it is possible to store the scrap from the beginning and the end of a production cycle in the storage hopper 46, then, once the production cycle is finished, it is possible to direct the contents of the storage hopper 46 towards the external mixer 12 via the enclosure 2 and the incoming chute 18. It is then possible to provide complete and high-quality treatment of the scrap inside the external mixer 12 in order to transform it into finished products, namely, high-quality hot-mix coated materials.

As shown, the recycling conveyor 42 is arranged to be substantially vertical and on one side of the enclosure 2 while opening out above the enclosure 2 and into said enclosure 2, substantially in line with the bypass outlet 11 via a secondary duct 44.

In another variant embodiment shown in FIG. 4, the device for manufacturing hot-mix coated materials may also comprise an external feed elevator 50 connected to the bypass outlet 11 and for example feeding an existing coating tower.

As shown in FIG. 4, which differs from the alternative illustrated on FIG. 3 only by the addition of the external feed elevator 50, said elevator is connected to the bypass outlet 11 by means of a duct 51 having its top portion connected to the bypass outlet 11 and its bottom portion connected to the bottom portion of the external feed elevator 50. Advantageously, said elevator is in the form of a substantially vertical tower that is located on one side of the device of the invention on its side opposite the side on which the recycling conveyor 40 is installed, which conveyor is connected to a conventional coating tower.

As shown, the device of the invention for manufacturing hot-mix coated materials may also comprise a pipe 53 connected inside the enclosure 2, preferably at the drying section and making it possible to discharge combustion gases into a suitable device for reprocessing (not shown).

The invention also provides a method of manufacturing hot-mix coated materials that presents the distinctive feature of being performed in a single device forming a complete installation comprising firstly, a drum mixer 2 defined by a main inlet 3 and a main outlet 30, said drum mixer 2 being made up of a series of successive sections comprising a combustion section 5, a drying section 6, and a mixing section 7 and secondly an external mixer 12 connected continuously to the drying section 6, said method being such that manufacturing hot-mix coated materials can be performed selectively and continuously by mixing, either in the mixing section of the drum 2, or in the external mixer 12 in the drying section 6 of the drum 2 and that the hot-mix coated materials manufactured may then be directed towards a shared outlet 35 of the single device for recovering them.

The device of the invention thus makes it possible to perform production cycles for producing hot-mix coated materials either by mixing granular materials in the oven forming the enclosure 2, or by using the external mixer 12 without having to change device and while keeping the same outlet for the finished coated product.

The method of the invention also makes it possible to ensure that scrap from the beginnings and the ends of production cycles is recycled in particularly effective and simple manner.

Recycling of the scrap from the beginnings or the ends of production cycles is performed by storing the scrap in a storage hopper 46 connected to a recycling system 40 connected to the drum, i.e. to the enclosure 2 in the vicinity of the bypass outlet 11. The storage hopper 46 is of sufficient capacity (1 (metric) tonne (t) to 4 t, for example) in order to be used as a buffer hopper during a complete production cycle.

Once the production cycle has finished, the scrap from the storage hopper 46 is discharged to the external mixer 12 in order to transform it into hot-mix coated materials in said external mixer 12. Then, the incoming chute 18 is used to pass the scrap from the storage hopper 46 to the inlet 13 of the external mixer 12 in which the scrap from the beginnings and the ends of production cycle(s) is treated and mixed so as to be transformed into hot-mix coated materials.

According to the invention, the device is formed by a device having parallel flow or counter-current flow, it being equally possible for the heating flow F to be in the same direction as the travel direction of the granular materials or in the opposite direction, i.e. a counter-current flow.

The operation of the device of the invention is explained below.

During operation and using a continuous cycle or a batch cycle, during which the hot granules advance inside the enclosure 1 along the direction F and in continuous or discontinuous manner, the granular material is transported from the inlet 3 to the outlet 30 or to the bypass outlet 11 while passing successively in full through the sections 5, 6, and possibly 7 of the device in order to be extracted via the outlet 30 or via the bypass outlet 11.

As a general rule, coated materials are manufactured using the mixing section 7 of the drum mixer to coat standard granular materials.

In this option of operation, the granular materials are discharged via the main outlet 30 while being guided by the down chute 19 towards the shared outlet 35 in order then to be discharged by the outlet conveyor 36.

When it is desirable to manufacture special hot-mix coated materials, requiring more complex management of the coating and mixing stages, the external mixer 12 is used. Specific adjustments are necessary in order to perform hot coating of granular materials while mixing them with coloring materials or plastics materials, the various components being mixed properly by using the special devices.

On such an occasion, the blocking system 15 is placed in its open position so as to allow granular materials to be poured via the down chute 18 into the external mixer 12 at its inlet 13.

After appropriate mixing and treatment in the external mixer 12, the final "special" bituminous coated material passes onto and into the shared outlet 35 in order to be able to be discharged by the outlet conveyor 36.

If need be, at the beginning or the end of the production cycle for the bituminous coated materials, regardless of whether they are made using the mixing section 7 or the external mixer 12, the scrap recycling system 40 is used to redirect into the enclosure 2 cycle beginnings and ends that have been insufficiently treated.

SUSCEPTIBILITY OF INDUSTRIAL APPLICATION

The invention is industrially applicable to designing, manufacturing, and using devices for manufacturing hot-mix coated materials, e.g. materials coated with bitumen, and also to performing hot-mix coated materials manufacturing methods.

The invention claimed is:

1. A device for manufacturing hot-mix coated materials, the device comprising:
    an oven comprising an enclosure that is substantially cylindrical and is rotatable about its longitudinal axis (X-X'), said enclosure being provided in the vicinity of its two opposite ends, firstly with a main inlet designed to receive non-coated virgin granular materials or recycled granular materials, or a mixture of both, of the type comprising chippings or granules, and secondly with a main outlet for coated materials that are manufactured inside the enclosure, said granular materials flowing from the main inlet towards the outlet along a direction F in order to be transformed into coated materials on reaching the main outlet, after passing through and being treated inside the enclosure; and
    a heater to define a combustion section inside the enclosure and generate a drying flow that is suitable for drying the granular materials, said enclosure starting with said combustion section and continuing with a drying section, and then with a mixing section;
    wherein the device is provided with a bypass outlet incorporated between the drying section and the mixing section, and with an external mixer including an inlet and an outlet, said external mixer being connected to said bypass outlet, which outlet is fitted with a blocking system that is movable between an open position allowing granular materials to pass towards the inlet of the external mixer and a closed position allowing granular materials to pass towards the mixing section.

2. A device according to claim 1, wherein the outlet of the external mixer and the main outlet are arranged relative to each other so as to open out into a shared outlet.

3. A device according to claim 2, wherein the external mixer is disposed under the mixing section, and substantially in line with the mixing section, and is connected firstly to the bypass outlet by an incoming chute opening out above the inlet (13) and secondly to the shared outlet via its outlet, above which and in line with which there opens out a down chute that is connected to the main outlet of the enclosure.

4. A device according to claim 3, wherein the shared outlet is connected to an outlet conveyor.

5. A device according to claim 3, wherein the external mixer is a paddle mixer or rotary mixer.

6. A device according to claim 3, wherein the device further comprises a system for recycling the scrap from the beginnings and the ends of production cycles.

7. A device according to claim 2, wherein the shared outlet is connected to an outlet conveyor.

8. A device according to claim 7, wherein the external mixer is a paddle mixer or rotary mixer.

9. A device according to claim 7, wherein the device further comprises a system for recycling the scrap from the beginnings and the ends of production cycles.

10. A device according to claim 2, wherein the device further includes an external feed elevator connected to the bypass outlet.

11. A device according to claim 1, wherein the external mixer is a paddle mixer or rotary mixer.

12. A device according to claim 11, wherein the device further comprises a system for recycling the scrap from the beginnings and the ends of production cycles.

13. A device according to claim 12, wherein the scrap recycling system is connected to the inside of the enclosure in the vicinity of the bypass outlet by a down channel in such a manner as to be capable of directing scrap towards the scrap recycling system before the scrap passes into the mixing section.

14. A device according to claim 1, wherein the device further comprises a system for recycling the scrap from the beginnings and the ends of production cycles.

15. A device according to claim 14, wherein the scrap recycling system is connected to the inside of the enclosure in the vicinity of the bypass outlet by a down channel in such a manner as to be capable of directing scrap towards the scrap recycling system before the scrap passes into the mixing section.

16. A device according to claim 15, wherein the scrap recycling system comprises a recycling conveyor having an inlet segment connected in the vicinity of the bypass outlet via the down channel, and an outlet segment that opens out into the enclosure via a storage hopper, in the drying zone.

17. A device according to claim 16, wherein the recycling conveyor is substantially vertical and opens out above the enclosure and does so substantially in line with the bypass outlet via a secondary duct.

* * * * *